(12) United States Patent
Pulles et al.

(10) Patent No.: US 7,306,732 B2
(45) Date of Patent: Dec. 11, 2007

(54) TREATMENT OF WATER

(75) Inventors: Wilhelmus Pulles, Johannesburg (ZA); Peter Dale Rose, Grahamstown (ZA)

(73) Assignee: Pulles Howard & De Lange, Inc. (ZA)

( * ) Notice: Subject to any disclaimer, the term of this patent is extended or adjusted under 35 U.S.C. 154(b) by 464 days.

(21) Appl. No.: 10/476,348

(22) PCT Filed: Apr. 30, 2002

(86) PCT No.: PCT/IB02/01442

§ 371 (c)(1),
(2), (4) Date: Mar. 8, 2004

(87) PCT Pub. No.: WO02/088032

PCT Pub. Date: Nov. 7, 2002

(65) Prior Publication Data
US 2004/0168975 A1    Sep. 2, 2004

(30) Foreign Application Priority Data
Apr. 30, 2001 (ZA) ................................ 2001/3493

(51) Int. Cl.
*C02F 3/00* (2006.01)
(52) U.S. Cl. ..................................... 210/610; 210/611
(58) Field of Classification Search ........ 210/610–611, 210/602
See application file for complete search history.

(56) References Cited

U.S. PATENT DOCUMENTS

| | | | |
|---|---|---|---|
| 4,039,438 A * | 8/1977 | Anderson .................... 210/610 |
| 4,584,271 A * | 4/1986 | Stern et al. .................. 435/167 |
| 4,715,958 A * | 12/1987 | Fuchs ......................... 210/605 |
| 4,721,585 A * | 1/1988 | Melchiorri Santolini et al. 210/616 |
| 5,269,929 A * | 12/1993 | Sublette et al. .............. 210/610 |
| 5,431,820 A * | 7/1995 | Nishida et al. .............. 210/611 |
| 5,474,682 A | 12/1995 | Buisman ...................... 210/610 |
| 5,637,220 A | 6/1997 | Buisman ...................... 210/605 |
| 6,315,904 B1 * | 11/2001 | Rose et al. .................. 210/602 |

OTHER PUBLICATIONS

International Search Report corresponding to PCT/IB02/01442. Mailed on Sep. 23, 2002.

* cited by examiner

*Primary Examiner*—Chester T. Barry
(74) *Attorney, Agent, or Firm*—Myers Bigel Sibley & Sajovec, PA

(57) ABSTRACT

A process (10) for treating sulphate-containing water (28) includes feeding the water into a biological sulphate reduction stage (12) containing a complex carbon source (18). The water is subjected to biological sulphate reduction in the presence of an electron donor source, thereby to reduce sulphates in the water to sulphides and to produce alkalinity. The complex carbon source is contacted with water containing higher sulphide and alkalinity concentrations or levels than the sulphate-containing feed water, thereby converting complex carbon molecules to electron donors. The, or another, electron donor source is regularly added to the biological sulphate reduction stage (12).

21 Claims, 1 Drawing Sheet

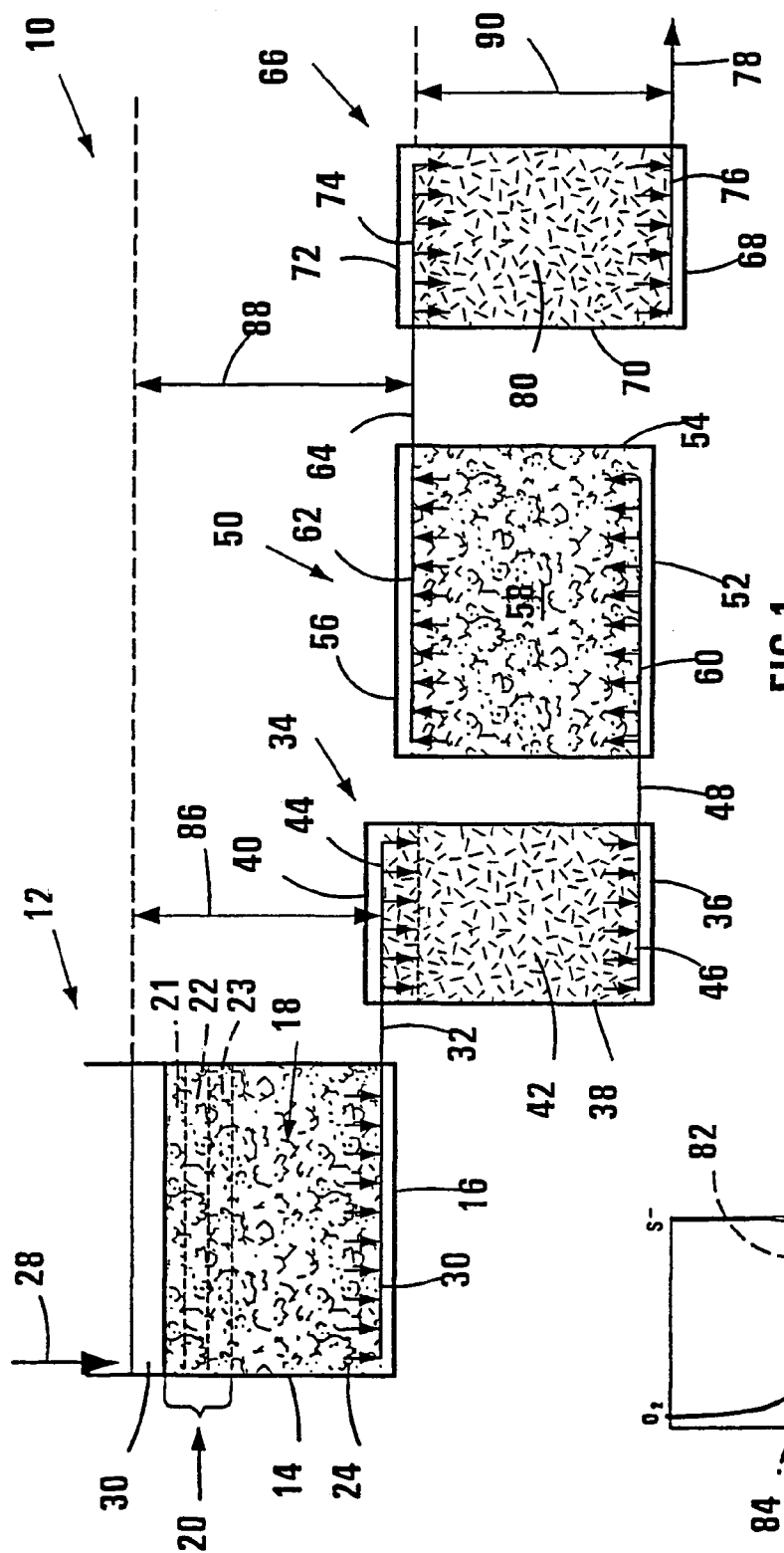

form PCT Application No. PCT/IB02/01442, filed in
TREATMENT OF WATER

RELATED APPLICATIONS

This application claims priority under 35 U.S.C. § 371 from PCT Application No. PCT/IB02/01442, filed in English on Apr. 30, 2002, which claims priority to South African Application No. 2001/3493, filed Apr. 30, 2001, the disclosures of which are incorporated by reference herein in their entireties.

THIS INVENTION relates to the treatment of water. It relates in particular to a process and installation for treating sulphate-containing water.

According to a first aspect of the invention, there is provided a process for treating sulphate-containing water, which process includes feeding sulphate-containing water into a biological sulphate reduction stage containing a complex carbon source;

subjecting the water to biological sulphate reduction in the presence of an electron donor source, thereby to reduce sulphates in the water to sulphides and to produce alkalinity;

contacting the complex carbon source with water containing higher sulphide and alkalinity concentrations or levels than the sulphate-containing feed water, thereby converting complex carbon molecules to electron donors; and regularly adding the, or another, electron donor source to the biological sulphate reduction stage.

The sulphate-containing water or influent which is fed into the biological sulphate reduction stage may, in particular, be waste water, such as sulphate-containing effluent from mines, tanneries and other industries.

The biological sulphate reduction in the biological sulphate reduction stage is thus effected by contact of the water with the electron donor source, thereby converting sulphates in the water to sulphides. The conversion of sulphates to sulphides is a biological mediated process involving a number of steps, primarily the following: hydrolysis of the complex carbon source into simpler dissolved organic compounds; and anaerobic fermentation of the simpler dissolved organic compounds to very simple organic compounds that can be used by a group of bacteria, collectively known as sulphate reducing bacteria, as the energy source (electron donor) to reduce sulphates to sulphides.

More particularly, the biological sulphate reduction of the sulphate-containing water may include establishing threshold sulphide and alkalinity concentration gradients or levels in the water, thereby permitting mobilization of the complex carbon source.

The threshold sulphide and alkalinity concentration gradients or levels may be established by controlling the stage so that the following conditions apply: (i) anaerobic metabolic processes are initiated, oxygen is consumed, and a redox potential of less than −150 mV is established; (ii) sulphate reduction is commenced, thereby producing the required sulphides and alkalinity; and (iii) extraction of readily soluble organic carbon molecules from the complex carbon source occurs, with the readily soluble organic carbon molecules thus constituting at least part of the electron donor source required for the biological reduction of the sulphates in the water to sulphides.

Condition (i) may be established in an initial layer in the stage, condition (ii) in an intermediate layer adjacent the initial layer, and condition (iii) in a final layer adjacent the intermediate layer so that the intermediate layer is sandwiched between the initial and final layers. Typically, the water in the intermediate layer may have a redox potential of about −250 mV, a sulphide concentration or level >30 mg/l, and an alkalinity concentration or level >30 mg/l, while the water in the final layer may have a redox potential of about −250 mV, a sulphate concentration or level >100 mg/l, and an alkalinity concentration or level >100 mg/l. Thus, the threshold sulphide concentration level may be ≧100 mg/l, while the threshold alkalinity concentration level may be ≧100 mg/l.

It will be appreciated that there will not necessarily be a sharp demarcation between the different layers; the layers will thus normally merge gradually into one another. Still further, conditions (i), (ii) and (iii) need not necessarily be established in separate layers; they can be established or co-exist in a single layer.

Conditions (i), (ii) and (iii) may be established in a recharge zone of the biological sulphate reduction stage. The biological sulphate, reduction stage may then also include a further carbon mobilization zone containing a complex carbon source and located adjacent the recharge zone, with the addition of the electron donor source thus being to the recharge zone, and with the threshold sulphide and alkalinity concentration gradients or levels established in the recharge zone resulting in further sulphate reduction and carbon mobilization occurring in the further carbon mobilization zone.

The biological sulphate reduction stage may be provided by a single reactor containing both the recharge zone and the further carbon mobilization zone. However, instead, the recharge zone and the further carbon mobilization zones can be provided by separate reactors, with the effluent from the recharge zone reactor then passing to the further carbon mobilization zone reactor.

The complex carbon source in the recharge zone may be the same as that in the further carbon mobilization zone. It may, in particular, be, ligno-cellulosic material, such as woodchips, hay, manure, sugarcane bagasse or any other processed or unprocessed plant material. The carbon mobilization stage may thus comprise a packed bed of the complex carbon source. The recharge zone may be located at the entrance to the packed bed of the complex carbon source.

In condition (i), the redox potential may thus be poised to below −150 mV, eg to −150 mV to −250 mV.

In condition (iii), the sulphide and alkalinity of the water have thus reached a sufficient concentration to initiate the extraction of the readily soluble organic carbon molecules from the complex carbon source or substrate. This in turn results in a further elevation of sulphide and alkalinity concentrations.

In condition (iii), the sulphide and alkalinity of the water has thus reached a sufficient concentration to initiate the extraction of the readily soluble organic carbon molecules from the complex carbon source or substrate. This in turn results in a further elevation of sulphide and alkalinity concentrations.

Where the electron donor source that is added, ie where the electron donor recharge is administered, as an organics rich liquid as hereinafter described, the final layer of the recharge zone is involved in elevating sulphide and alkalinity concentrations to the threshold values required for a subsequent stage of the process, as also hereinafter described.

The Applicant believes that efficient operation of the biological sulphate reduction stage, and in particular efficient operation of the carbon mobilization zone thereof, particularly as regards the secondary phase of its function following the exhaustion of readily soluble organic carbon molecules from the complex carbon source, depends largely on the maintenance of a threshold concentration of sulphide and alkalinity in the final layer of the recharge zone.

As hereinbefore stated, the complex carbon source may, in particular, be ligno-cellulosic material. It is believed that the threshold concentration of sulphide and alkalinity in the recharge zone, is required for cleavage of ligno-cellulose molecules. A first step involves the cleavage of lignin, and its conversion from a range of aromatic compounds, measured as total phenolics, to a range of volatile fatty acids, including acetate. This provides an electron donor or carbon source for further sulphate reduction, which in turn acts to mobilize additional ligno-cellulosic material. The progression of this reaction to a certain stage is necessary in order to initiate the exposure and mobilization of the cellulose fraction of the ligno-cellulosic material. At this point, both acetate and cellulose are consumed, and the major part of the sulphate reduction takes place in the carbon mobilization zone.

The readily soluble organic carbon molecules in the complex carbon source, typically initially constitute the entire electron donor source. However, once most or all of these molecules have been consumed, it becomes necessary to add some more of the, or another, electron donor source to the recharge zone in order to maintain the required threshold sulphide and alkalinity concentration gradients or levels for cleavage of the ligno-cellulosic molecules. In other words, the recharge zone must regularly be recharged or replenished with the, or an, electron donor source.

The further electron donor source that is added to the recharge zone may be readily biodegradable carbon. The addition of the readily biodegradable carbon may take place from time-to-time or intermittently, as required; however, it can instead take place more-or-less continuously, if desired.

The following mechanisms thus occur or are present in the recharge zone: fresh carbon, containing a high concentration of readily biodegradable carbon, and being in solid, liquid or gaseous form, is added, either intermittently, ie from time-to-time, or continuously; oxygen depletion occurs, ie oxygen concentrations in the water are higher towards an inlet end or part of the recharge zone than towards an outlet end or part thereof; and anaerobic conditions prevail in a portion of the recharge zone. Sulphate reduction, and sulphide and alkalinity generation, commence in the recharge zone, ie sulphide and alkalinity concentrations are higher at an outlet end or part of the recharge zone than at an inlet end or part thereof, while sulphate concentrations are lower at the outlet end or part of the recharge zone than at its inlet end or part.

The electron donor source or readily biodegradable carbon that may be added to the recharge zone may be in solid, liquid or gaseous form.

When the electron donor source that is added to the recharge zone is a solid carbon-based material providing readily biodegradable carbon, then the biological sulphate reduction stage will operate in a downward mode so that water passes downwardly through it. The carbon mobilization zone is then located below the recharge zone. The recharge zone may then optionally be overlain by a layer of influent water that is open to the atmosphere.

Where the biological sulphate reduction stage is replenished with solid carbon material and is operated in the downflow mode, such material may be added at regular intervals or continuously to the upper layer of the recharge zone, with the spent material thus forming the intermediate layer of the recharge zone and, with the passage of time, the lowermost final zone. In this manner, the high sulphate reduction which is available with fresh carbon material in the first layer of the recharge zone, can be maintained more-or-less continuously, ie the recharge zone does not become rate-limiting. Additionally, as material is added to the top of the bed, the height of the bed increases, with the heights of the layers or zones thus also increasing over time. Conversely, as carbon material is consumed by sulphate reduction, the height of the bed decreases.

In one embodiment of the invention, a bed of wetland plants, eg a reed bed, may be provided in the recharge zone. The plants may then, from time-to-time, be allowed to die back, or be cut back, with the thus harvested plants thus being added to the stage and providing the readily biodegradable carbon.

In another embodiment of the invention, the solid carbon-based material that is added to the recharge zone may be an externally obtained material that is added to the recharge zone from time-to-time or continuously. Such externally obtained carbon material may be hay, grass, woodchips, manure, sewage sludge, sugar cane bagasse or any other plant material that is readily biodegradable.

When the electron donor source that is added to the recharge zone is in liquid form, then the biological sulphate reduction stage may be operated in an open downflow mode, eg in a reactor that is open to the atmosphere, or in an enclosed downflow mode or in an enclosed upflow mode, eg in a sealed reactor.

The electron donor source material that is added to the recharge zone may thus comprise high COD liquid material which is added to an inlet of the stage from time-to-time or continuously. Such material may be sewage, molasses, effluent from feedlots or piggeries, abattoirs, yeast factories, dairies or liquid material from a separate aerobic hydrolysis reactor.

When the electron donor source that is added to the recharge zone is in gaseous form, it may be selected from the group consisting in hydrogen, methane, producer gas or mixtures thereof.

The process may include
  withdrawing partially treated sulphide-rich water, from the biological sulphate reduction stage ("the primary biological sulphate reduction stage");
  feeding the partially treated sulphide-rich water into an enclosed primary sulphide removal stage;
  subjecting the water to chemical and/or biological sulphide oxidation in the primary sulphide removal stage, thereby removing at least some of the sulphides present in the water as sulphide precipitates or as elemental sulphur;
  withdrawing partially treated sulphide-depleted water from the primary sulphide removal stage;
  feeding the partially treated sulphide-depleted water into an enclosed anaerobic secondary biological sulphate reduction stage;
  subjecting the water to further biological sulphate reduction, under anaerobic conditions, in the secondary biological sulphate reduction stage, thereby further to reduce sulphates in the water to sulphides;
  withdrawing sulphide-rich treated water from the secondary biological sulphide reduction stage;
  feeding the sulphide-rich treated water into a secondary sulphide removal stage;
  subjecting the sulphide-rich treated water to sulphide removal in the secondary sulphide removal stage; and withdrawing treated water from the secondary sulphide removal stage.

As hereinbefore described, in addition to the sulphate reduction or removal that is effected in the primary biological sulphate reduction stage, high levels of soluble organic material in the partially treated sulphide-rich water or effluent from the primary biological sulphate reduction stage are obtained. This soluble organic material is produced by means of sulfidogenic-enhanced hydrolysis whereby the high levels of sulphides and alkalinity present in the stage assist in the breakdown, ie hydrolysis, of the solid carbon material in the stage. Thus, the primary biological sulphate reduction stage in which both the primary biological sulphate reduction and the sulfidogenic hydrolysis take place, can also be referred to as a degrading packed bed reactor ('DPBR').

The partially treated sulphide-rich water from the primary biological sulphate reduction stage thus passes to the primary sulphide removal stage which provides an anaerobic environment wherein sulphides produced in the primary biological sulphate reduction stage are removed.

Thus, in the enclosed primary sulphide removal stage, sulphide removal is effected by a chemical reaction mechanism in which the sulphides are reacted with a metal, such as iron, to form a metal sulphide precipitate or an elemental sulphur precipitate. Alternatively, in the enclosed primary sulphide removal stage, the sulphide removal may be effected by a biological reaction mechanism in which the sulphides are oxidized to elemental sulphur.

The degree of sulphide removal required in the primary sulphide removal stage will depend on the level of sulphides produced in the primary biological sulphate reduction stage and the level of sulphides required in the secondary biological sulphate reduction stage.

The partially treated sulphide-depleted water from the primary sulphide removal stage may pass upwardly or downwardly through the enclosed anaerobic secondary biological sulphate reduction stage, which provides a neutral, buffered, low sulphide concentration environment for enhanced sulphate reduction under anaerobic conditions.

The secondary biological sulphate reduction stage may also comprise a bed of carbon-containing material. This material should have a long life, ie provide activity over a long period of time since it is not readily replenishable due to the sealing of the stage. The carbon-containing material may be ligno-cellulosic material, and may in particular be untreated or pretreated woodchips, ie woodchips that have been pretreated to render the lignin and/or the cellulose/hemicellulose therein more amenable to reaction, maize stalks, hay, or the like. The secondary biological sulphate reduction stage can also be referred to as an enhanced sulphate reduction reactor ('ESRR').

Although, as mentioned hereinbefore, the secondary biological sulphate reduction stage or ESRR will not normally be replenished, eg at the rate of replenishment of the first layer or zone of the bed of the primary biological sulphate reduction stage or DPBR, the secondary biological sulphate reduction stage can, of course, be opened and replenished after a long run; instead, however, when its efficiency drops below a desired level, it can be by-passed and sealed for isolation.

The process may include a single primary biological sulphate reduction stage or DPBR which feeds a plurality of primary sulphide removal stages; however, other configurations are also feasible, eg a plurality of primary biological sulphate reduction stages or DPBR feeding a lesser number of primary sulphide removal stages, eg feeding a single primary sulphide removal stage only.

Similarly, a single primary sulphide removal stage may feed a plurality of secondary biological sulphate reduction stages or ESRR; however, other configurations are also feasible, eg a plurality of primary sulphide removal stages may feed a lesser number of secondary biological sulphate reduction stages or ESRR, eg may feed a single secondary biological sulphate reduction stage or ESRR only.

The treatment of the water in the secondary sulphide removal stage to remove sulphide therefrom comprises converting the sulphides to readily removable sulphur or metal sulphides by chemical and/or biochemical reaction, and separating the sulphur or metal sulphides from the water, with sulphide lean treated water being withdrawn from the secondary sulphide removal stage.

The treated water from the secondary sulphide removal stage may be treated further, if desired. For example, it may be subjected to aerobic polishing to remove dissolved organic compounds and nutrients such as phosphates and ammonia.

The water flow rate through the process may be manipulated in such a way as to maximize substrate, ie complex carbon source, mobilization at the expense of sulphate reduction, and provide an effluent from the primary biological sulphate reduction stage which contains high levels of volatile fatty acids. These volatile fatty acids then constitute a further carbon source, for further sulphate reduction, when the effluent passes into the secondary biological sulphate reduction stage.

It is envisaged that the process of the invention can, in one embodiment of the invention, be operated as a passive water treatment process, ie all energy requirements for the process are internally and/or naturally derived, eg by means of hydraulic heads, biological activity, photosynthesis, or the like, with no permanent external non-naturally occurring energy sources such as electricity, being required. Thus, the primary biological sulphate reduction stage or DPBR, the primary sulphide removal stage, the secondary biological sulphate reduction stage or ESRR, and the secondary sulphide removal stage may be arranged such that the primary biological sulphate reduction stage or DPBR provides a sufficient hydraulic head to ensure water flow through the primary sulphide removal stage, the secondary biological sulphate reduction stage or ESRR and the secondary sulphide removal stage. Thus, the upper ends of the primary sulphide removal stage, the secondary biological sulphate reduction stage or ESRR, and the secondary sulphide removal stage will be located at a lower level than the upper end of the primary biological sulphate reduction stage or DPBR. Additionally, it is envisaged that, where a solid electron donor recharge is used, to provide optimum lifetime for the primary biological sulphate reduction stage or DPBR, it will initially contain relatively little carbon material, ie the first, intermediate and final levels will initially be very shallow, with just sufficient material being provided to deplete oxygen and commence sulphate reduction; as this material is depleted, fresh carbon material is added to the first layer or zone as hereinbefore described, so that the stage gradually fills up, with the layers becoming deeper as time progresses. However, it must be ensured that even at start-of-run conditions, the primary biological sulphate reduction stage or DPBR provides sufficient driving head to operate the process in a passive fashion.

However, in another embodiment of the invention, the process can be operated in active fashion, ie using external energy to drive water pumps, etc.

According to a second aspect of the invention, there is provided a process for treating sulphate-containing water, which process includes feeding sulphate-containing water into a primary biological sulphate reduction stage containing a complex carbon source;

subjecting the water to biological sulphate reduction in the primary biological sulphate reduction stage, thereby to reduce sulphates in the water to sulphides, to produce alkalinity and to mobilize the complex carbon source;

withdrawing partially treated sulphide-rich, alkalinity-rich and dissolved carbon-rich water from the primary biological sulphate reduction stage;

feeding the partially treated sulphide-rich, alkalinity-rich and dissolved carbon-rich water into an enclosed primary sulphide removal stage;

subjecting the water to chemical and/or biological sulphide oxidation in the primary sulphide removal stage, thereby removing at least some of the sulphides present in the water as sulphide precipitates or as elemental sulphur;

withdrawing partially treated sulphide-depleted water but still alkalinity-rich and dissolved carbon-rich from the primary sulphide removal stage;

feeding the partially treated sulphide-depleted, alkalinity-rich and dissolved carbon-rich water into an enclosed anaerobic secondary biological sulphate reduction stage containing carbon material;

subjecting the water to further biological sulphate reduction, under anaerobic conditions, in the secondary biological sulphate reduction stage, utilizing the carbon material present in the stage and the dissolved carbon material produced in the primary biological sulphate reduction stage, thereby further to reduce sulphates in the water to sulphides;

withdrawing sulphide-rich and alkalinity-rich treated water from the secondary biological sulphate reduction stage;

feeding the sulphide-rich and alkalinity-rich treated water into a secondary sulphide removal stage;

subjecting the sulphide-rich and alkalinity-rich treated water to sulphide removal in the secondary sulphide removal stage; and withdrawing treated water from the secondary sulphide removal stage.

The sulphate-containing water, the primary and secondary sulphate reduction stages, and the primary and secondary sulphide removal stages, may be as hereinbefore described with reference to the first aspect of the invention.

According to a third aspect of the invention, there is provided a water treatment installation which comprises a primary biological sulphate reduction unit which contains a bed of carbon-containing material;

a first water transfer conduit leading from the primary biological sulphate reduction unit;

a primary biological or chemical sulphide removal unit from which precipitated sulphides or sulphur can be removed, with the first water transfer conduit leading into the primary sulphide removal unit;

a second water transfer conduit leading from the primary sulphide removal unit;

a secondary sealed biological sulphate reduction unit which also contains a bed of carbon-containing material, with the second water transfer conduit leading into the secondary biological sulphate reduction unit at or near its lower end;

a third water transfer conduit leading from the secondary biological sulphate reduction unit at or near its upper end;

a secondary sulphide removal unit, with the third water transfer conduit leading into the secondary sulphide removal unit; and a fourth water conduit leading from the secondary sulphide removal unit.

The primary and secondary biological sulphate reduction units may have substantially vertical walls extending upwardly from a floor. The walls and floor will thus be more-or-less water-impervious. The walls and floor may be of brick, concrete or the like; instead, they may be of soil which has been treated to render it more-or-less water-impervious, eg packed with manure which has been allowed to dry. It is believed that this latter construction will have cost advantages over brick and concrete constructions, while providing an adequate level of waterproofing. In particular, the walls may be arranged in opposed parallel pairs so that the units are square or rectangular in plan view.

The beds in the primary and secondary biological sulphate reduction units may be in accordance with the beds of the primary and secondary biological sulphate reduction stages respectively, as hereinbefore described with reference to the first aspect of the invention. Thus, the primary biological sulphate reduction stage may be a degrading packed bed reactor or DPBR, as hereinbefore described, while the secondary biological sulphate reduction stage may be an enhanced sulphate reduction reactor or ESRR, as also hereinbefore described. The primary and secondary sulphide reduction units may also be in accordance with the primary and secondary sulphide reduction stages hereinbefore described with reference to the first aspect of the invention.

A manifold for water collection or distribution purposes may be provided at the bottom and/or the top of the DPBR, at the bottom and at the top of the primary sulphide reduction unit, at the bottom and at the top of the ESRR, and at the bottom and at the top of the secondary sulphide removal unit, with the water conduits being connected to the manifolds.

It is envisaged that the installation will be designed to handle a predetermined hydraulic load, eg 10-100 $m^3$/day. To cater for larger loads, further units can be supplied. In other words, each combination of DPBR and ESRR and primary and secondary sulphide reduction units will constitute a module, with the required number of modules to handle a particular hydraulic load then being arranged in parallel.

The invention will now be described by way of example with reference to the accompanying diagrammatic drawings.

In the drawings,

FIG. 1 shows, in simplified flow diagram form, a process according to the invention for treating sulphate-containing water; and FIG. 2 shows a graph of oxygen and sulphide concentrations in the water at different levels in the primary sulphate reduction stage or DPBR of FIG. 1.

In the drawings, reference numeral 10 generally indicates a process according to the invention for treating sulphate-containing water.

The process 10 includes a primary sulphate reduction stage or degrading packed bed reactor ('DPBR'), generally indicated by reference numeral 12. The DPBR 12 comprises vertical walls 14 which are arranged in opposed pairs so that the stage or unit 12 is square or rectangular in plan view. The walls 14 protrude upwardly from a floor 16. The DPBR 12 includes a bed 18 of carbon-containing material providing a complex carbon source. Typically, the carbon-containing material is ligno-cellulosic material, such as woodchips, hay, grass, manure or any other plant material. The bed 18 comprises an upper recharge zone 20, and a carbon mobilization zone 24 below the recharge zone 20.

The recharge zone 20 includes an initial or-upper layer 21 in which, in use, condition (i) exists, ie anaerobic metabolic processes are initiated therein, oxygen is consumed therein, and a redox potential is poised to below −150 mV. In other words, water exiting the layer 21 has a redox <−150 mV. The recharge zone 20 also includes an intermediate layer 22 below the initial layer 21. In use, condition (ii) exists in layer 22, ie sulphate reduction to sulphides and alkalinity production are commenced therein. Typically, the water exiting the layer 22 has a redox of about −250 mV, a sulphide concentration >30 mg/l, and an alkalinity level >30 mg/l. Finally, the recharge zone 20 includes a lower layer 23 below the intermediate layer 22. In use, condition (iii) exists in the layer 23, ie sulphide and alkalinity concentration levels are sufficient to initiate the extraction of readily soluble organic carbon molecules from the complex carbon source. Typically, the water exiting the layer, 23 has a redox of about −250 mV, a sulphide concentration >100 mg/l, and an alkalinity level >100 mg/l.

The upper layer 21 of the recharge zone 20 comprises readily biodegradable carbon material, ie freshly placed ligno-cellulose material, lying on the top of the bed 18.

Influent water, ie sulphate-containing waste water, enters the top of the DPBR 12 as indicated by arrow 28, and forms a layer 30 on top of the bed 18. The layer 30 is open to the atmosphere. Water flows downwardly through the bed 18.

A collection manifold 30 is provided at the bottom of the DPBR 12, with a water transfer conduit 32 leading from the manifold 30.

The process 10 includes a primary sulphide reduction stage or unit 34. The stage or unit 34 comprises a floor 36, walls 38 and roof 40 defining an enclosed space containing a bed 42 of scrap iron particles. A distribution manifold 44 is located at the top of the bed 42 and is connected to the conduit 32. A collection manifold 46 is located at the bottom of the unit or stage 34, with a water transfer conduit 48 leading from the manifold 46.

The process 10 also includes a secondary sulphate reduction stage or enhanced sulphate reduction reactor ('ESRR') 50. The ESRR 50 comprises a floor 52, with walls 54, which are arranged in opposed parallel pairs, extending upwardly from the floor 52. The ESRR 50 is thus also square or rectangular in plan view. The ESRR 50 is sealed by means of a roof 56 which closes off the upper ends of the walls 54. An anaerobic reaction zone is thus provided by the ESRR 50.

A bed 58 of untreated woodchips is provided inside the ESRR 50. A distribution manifold 60 to which the water transfer conduit 48 is connected, is provided at the bottom of the unit or stage 50. A collection manifold 62 is provided at the top of the ESRR 50, with a water transfer conduit 64 leading from the manifold 62.

The process 10 also includes a secondary sulphide removal stage or unit, generally indicated by reference numeral 66. The unit or stage 66 comprises a floor 68, walls 70 protruding upwardly from the floor 68 and a roof 72 closing off the walls.

A distribution manifold 74 is provided at the upper end of the stage or unit 66 and is connected to the water transfer conduit 64. A collection manifold 76 is provided at the lower end of the unit or stage 66, with a water withdrawal conduit 78 leading from the manifold. The sulphide removal stage or unit contains a bed 80 of scrap iron particles.

In use, aerobic sulphate-containing waste water such as mine effluent, enters the DPBR 12, as indicated by arrow 28, and forms a layer 30 above the recharge zone 20. As the water passes downwardly through the bed 18, sulphates in the water are reduced to sulphides, by means of the mechanisms hereinbefore described. Oxygen depletion takes place as the water passes downwardly, while sulphide and alkalinity concentrations or levels increase, as indicated in FIG. 2 in which the line 82 represents the interface between the first upper layer 21 and the intermediate layer 22 of the recharge zone 20, while the line 84 represents the interface between the lower layer 22 of the recharge zone 20, and the carbon mobilization zone 24 of the bed 18. Simultaneously, sulfidogenic-enhanced hydrolysis of solid carbon material to produce soluble organic material, as hereinbefore described, takes place.

Sulphide-rich partially treated water, which still contains some sulphates and which is enriched in soluble organic material and alkalinity, is withdrawn from the bottom of the bed 18 through the manifold 30 and the conduit 32, and fed into the upper end of the stage 34. The stage 34 functions by means of chemical or biological sulphide removal. It is postulated that, for example, the stage 34 can contain the bed 42 of scrap iron particles so that sulphides present in the water can be subjected to chemical sulphide removal by the sulphides reacting with the iron to form iron sulphides, which precipitate out of the water. The water thus passes downwardly through the bed 42 in the stage 34. At the lower end of the stage 34, the partially treated sulphide deficient water is withdrawn through the manifold 34 and conduit 48, and passes into the lower end of the ESRR 50. The water passes upwardly through the bed 58 of the ESRR 50, where further reduction of sulphates to sulphides occurs. Sulphide-rich treated water is withdrawn from the upper end of the ESRR 50 through the manifold 62 and transferred to the secondary sulphide removal stage 66 along the conduit 64 and the manifold 74. It is postulated that the stage 66 can also function by means of a chemical sulphide removal mechanism, by contacting it with iron particles present on the bed 80, in similar fashion to that hereinbefore described in respect of the unit or stage 34. Sulphide- and sulphate-free treated water is removed from the unit or stage 66 through the manifold 76 and the conduit 78.

The process 10 is a so-called passive process since no permanent external non-natural energy is required for the process 10. Thus, the upper level of the DPBR 12 is at a higher level than the upper ends of the stages 34, 50 and 66 so as to provide hydraulic heads, indicated by arrows 86, 88 which provide the necessary driving head for passage of the water through the various units. Additionally, the treated water conduit 78 is located at a sufficiently low level below the manifold 74 to provide a driving head, indicated by arrow 90, for the secondary sulphide removal unit 66.

When the process 10 operates in a passive fashion, no permanent external energy such as electricity to drive pumps is required. This has the advantage over active treatment systems in that the process 10 then requires little or no maintenance or regular operator supervision; however, some operator input is required in respect of replenishing the readily biodegradable carbon source in the DPBR 12, eg by adding fresh ligno-cellulose material to the upper layer 21 of the recharge zone. This activity must take place regularly, ie from time-to-time, and this operator input can typically be provided by communities left behind at the closure of a mine whose effluent is treated in the process.

It is believed that this approach will provide flexibility to the process 10, eg it permits down- or upscaling of the rate at which fresh carbon is added to the DPBR 12, in order to accommodate temporal changes in the flow rate and quality of the influent.

Additionally, final land use of a portion of a closed mine from which the influent is obtained, can be used for active production of the carbon source.

Additionally, the operator visits, albeit infrequent, to the passive treatment process should result in improved levels of maintenance and plant performance.

However, instead, the process 10 can be an active process using external energy to drive pumps to pump the water, etc.

In another embodiment of the invention (not shown), instead of the further sulphate reduction zone 24 being provided in the same reactor 12 as the recharge zone 20, it can be provided in a separate reactor located between the reactor 12 and the primary sulphide reduction unit 24.

In yet another embodiment of the invention (not shown), a portion of the incoming aerobic sulphate-containing waste water can bypass the reactor 12, and be routed directly to the line 48 leading to the reactor 50. This will permit manipulation of the water flow rate through the process, eg to maximize, in the reactor 12, substrate mobilization at the expense of sulphate reduction in the carbon mobilization zone 24, with the effluent exiting the reactor 12 then containing high levels of volatile fatty acids, which then serve as a carbon source for further sulphate reduction in the reactor 50.

The invention claimed is:

1. A process for treating sulphate-containing water, comprising the steps of:
   feeding sulphate-containing water into a degrading packed bed reactor containing a complex carbon source, in which biological sulphate reduction and sulfidogenic hydrolysis take place;
   subjecting the water to biological sulphate reduction in the presence of an electron donor source, thereby to reduce sulphates in the water to sulphides and to produce alkalinity;
   contacting the complex carbon source with water containing higher sulphide concentrations and higher alkalinity concentrationse than the sulphate-containing feed water, thereby converting complex carbon molecules to electron donors; and
   adding, intermittently or continuously, the, or another, electron donor source to the degrading packed bed reactor.

2. The process according to claim 1, wherein the biological sulphate reduction of the sulphate-containing water includes establishing threshold sulphide concentrations and threshold alkalinity concentrations in the water, thereby permitting sulphidogenic hydrolysis of the complex carbon source.

3. The process according to claim 2, wherein the threshold sulphide concentrations and threshold alkalinity concentrations are established by controlling the degrading packed bed reactor so that the following conditions apply: (i) anaerobic metabolic processes are initiated, oxygen is consumed, and a redox potential of less than −150 mV is established; (ii) sulphate reduction is commenced, thereby producing the threshold sulphide concentrations and the threshold alkalinity concentrations; and (iii) extraction of soluble organic carbon molecules from the complex carbon source occurs, with the soluble organic carbon molecules thus constituting at least part of the electron donor source required for the biological reduction of the sulphates in the water to sulphides.

4. The process according to claim 3, wherein condition (i) is established in an initial layer in the degrading packed bed reactor, condition (ii) in an intermediate layer adjacent to the initial layer, and condition (iii) in a final layer adjacent to the intermediate layer so that the intermediate layer is sandwiched between the initial and final layers.

5. The process according to claim 3, wherein conditions (i), (ii) and (iii) are established in a recharge zone of the degrading packed bed reactor, with the degrading packed bed reactor including a carbon mobilization zone in which sulfidogenic hydrolysis takes place, and which contains a complex carbon source and is located adjacent to the recharge zone, with the addition of the electron donor source thus being to the recharge zone, and with the threshold sulphide concentrations and the threshold alkalinity concentrations established in the recharge zone resulting in further sulphate reduction and sulfidogenic hydrolysis of the complex carbon source occurring in the carbon mobilization zone.

6. The process according to claim 5, wherein the complex carbon source in the recharge zone is the same as that in the carbon mobilization zone, and is ligno-cellulosic material.

7. The process according to claim 5, wherein the sulphate-containing water is waste water; the degrading packed bed reactor contains a bed of the complex carbon source; and the electron donor source that is added to the recharge zone is in solid, liquid or gaseous form.

8. The process according to claim 7, wherein the electron donor source that is added to the recharge zone is a solid carbon-based material, with the degrading packed bed reactor operating in a downward mode so that the carbon mobilization zone is located below the recharge zone and with the recharge zone optionally being overlain by a layer of influent water that is open to the atmosphere, and, optionally, wherein, a bed of wetland plants is provided in the recharge zone, with the plants, from time-to-time, being allowed to die back, or being cut back, with the thus harvested plants thus being added to the degrading packed bed reactor as the solid carbon-based material, or wherein the solid carbon-based material that is added to the recharge zone is an externally obtained material that is added to the recharge zone from time-to-time or continuously.

9. The process according to claim 7, wherein the electron donor source that is added to the recharge zone is in liquid form, with the degrading packed bed ractor operating in an open downflow mode or in an enclosed downflow mode or in an enclosed upflow mode, or wherein the electron donor source that is added to the recharge zone is in gaseous form, and is selected from the group consisting in hydrogen, methane, producer gas or mixtures thereof.

10. The process according to claim 1, further comprising:
    withdrawing partially-treated water from the degrading packed bed reactor;
    feeding the partially-treated water from the degrading packed bed reactor into an enclosed primary sulphide removal unit;
    subjecting the water to chemical and/or biological sulphide oxidation in the primary sulphide removal unit, thereby removing at least some of the sulphides present in the water as sulphide precipitates or as elemental sulphur; withdrawing partially-treated water from the primary sulphide removal unit;

feeding the partially-treated water from the primary sulphide removal unit into an enhanced sulphate reduction reactor;

subjecting the water to further biological sulphate reduction, under anaerobic conditions, in the enhanced sulphate reduction reactor, thereby further to reduce sulphates in the water to sulphides;

withdrawing treated water from the enhanced sulphate reduction reactor;

feeding the treated water from the enhanced sulphate reduction reactor into a secondary sulphide removal unit;

subjecting the treated water to sulphide removal in the secondary sulphide removal unit; and withdrawing treated water from the secondary sulphide removal unit.

11. The process according to claim 10 wherein, in the enclosed primary sulphide removal unit, the sulphide removal is affected by a chemical reaction mechanism in which the sulphides are reacted with a metal to form a metal sulphide precipitate or an elemental sulphur precipitate, or by a biological reaction mechanism in which the sulphides are oxidized to elemental sulphur, and/or wherein the partially-treated water from the primary sulphide removal unit passes upwardly through the enhanced sulphate reduction reactor, which provides a neutral, buffered, environment for enhanced sulphate reduction under anaerobic conditions, and/or wherein the treatment of the water in the secondary sulphide removal unit to remove sulphides therefrom comprises converting the sulphides to removable sulphur or metal sulphides by chemical and/or biochemical reaction, and separating the sulphur or metal sulphides from the water, with treated water being withdrawn from the secondary sulphide removal unit, and/or wherein the enhanced sulphate reduction reactor comprises a bed of untreated or pretreated woodchips as the carbon source.

12. The process for treating sulphate-containing water, comprising the steps of:
feeding sulphate-containing water into a degrading packed bed reactor containing a complex carbon source;

subjecting the water to biological sulphate reduction in the degrading packed bed reactor, thereby to reduce sulphates in the water to sulphides, to produce alkalinity and to sulfidogenically hydrolyze the complex carbon source;

withdrawing partially-treated water from the degrading packed bed reactor;

feeding the partially-treated water from the degrading packed bed reactor into an enclosed primary sulphide removal unit;

subjecting the water to chemical and/or biological sulphide oxidation in the primary sulphide removal unit, thereby removing at least some of the sulphides present in the water as sulphide precipitates or as elemental sulphur;

withdrawing partially-treated water from the primary sulphide removal unit;

feeding the partially-treated water from the primary sulphide removal unit into an enhanced sulphate reduction reactor containing carbon material;

subjecting the water to further biological sulphate reduction, under anaerobic conditions, in the enhanced sulphate reduction reactor, utilizing the carbon material present in the enhanced sulphate reduction reactor and the dissolved carbon material produced in the degrading packed bed reactor, thereby further to reduce sulphates in the water to sulphides;

withdrawing treated water from the enhanced sulphate reduction reactor;

feeding the treated water from the enhanced sulphate reduction reactor into a secondary sulphide removal unit;

subjecting the water to sulphide removal in the secondary sulphide removal unit; and withdrawing treated water from the secondary sulphide removal unit.

13. The process according to claim 12, wherein the biological sulphate reduction takes place in the presence of an electron donor source; and the, or
another, electron donor source is intermittently or continuously added to the degrading packed bed reactor.

14. The process according to claim 12, wherein the biological sulphate reduction of the sulphate-containing water in the degrading packed bed reactor includes establishing threshold sulphide concentrations and threshold alkalinity concentrations in the water, thereby permitting sulfidogenic hydrolysis of the complex carbon source.

15. The process according to claim 14, wherein the threshold sulphide concentrations and the threshold alkalinity concentrations are established by controlling the degrading packed bed reactor so that the following conditions apply: (i) anaerobic metabolic processes are initiated, oxygen is consumed, and a redox potential of less than −150 mV is established; (ii) sulphate reduction is commenced, thereby producing the threshold sulphide concentrations and the threshold alkalinity concentrations; and (iii) extraction of soluble organic carbon molecules from the complex
carbon source occurs, with the soluble organic carbon molecules thus constituting at least part of the electron donor source required for the biological reduction of the sulphates in the water to sulphides.

16. The process according to claim 15, wherein conditions (i), (ii) and (iii) are established in a recharge zone of the degrading packed bed reactor, with the degrading packed bed reactor also including a carbon mobilization zone in which the sulfidogenic hydrolysis takes place, and which contains a complex carbon source and is located adjacent to the recharge zone, with the addition of the electron donor source thus being to the recharge zone, and with the threshold sulphide concentrations and the threshold alkalinity concentrations established in the recharge zone resulting in further sulphate reduction and sulfidogenic hydrolysis of the complex carbon source occurring in the carbon mobilization zone.

17. The process according to claim 16, wherein the complex carbon source in the recharge zone is the same as that in the carbon mobilization zone, and is ligno-cellulosic material.

18. The process according to claim 16, wherein the sulphate-containing water is waste water; the degrading packed bed reactor contains a bed of the complex carbon source; and the electron donor source that is added to the recharge zone is in solid, liquid or gaseous form.

19. The process according to claim 18, wherein the electron donor source that is added to the recharge zone of the degrading packed bed reactor, is a solid carbon-based material, with the degrading packed bed reactor operating in a downward mode so that the carbon mobilization zone is located below the recharge zone, and with the recharge zone optionally being overlain by a layer of influent water that is open to the atmosphere, and, optionally, wherein a bed of wetland plants is provided in the recharge zone, with the plants, from time-to-time, being allowed to die back, or being cut back, with the thus harvested plants being added to the degrading packed bed reactor as the solid carbon-based material, or wherein the solid carbon-based material that is added to the recharge zone is an externally obtained carbon material that is added to the top of the first layer from time-to-time or continuously.

20. The process according to claim 18, wherein the electron donor source that is added to the recharge zone is in liquid form, with the degrading packed bed reactor operating in an open downflow mode or in an enclosed downflow mode or in an enclosed upflow mode, or wherein the electron donor source that is added to the recharge zone is in gaseous form, and is selected from the group consisting in hydrogen, methane, producer gas, or mixtures thereof.

21. The process according to claim 12 wherein, in the enclosed primary sulphide removal unit, the sulphide removal is affected by a chemical reaction mechanism in which the sulphides react with a metal to form a metal sulphide precipitate or an elemental sulphur precipitate, or by a biological reaction mechanism in which the sulphides are oxidized to elemental sulphur, and/or wherein the partially-treated water from the primary sulphide removal unit passes upwardly through the enhanced sulphate reduction reactor, which provides a neutral, buffered, environment for enhanced sulphate reduction under anaerobic conditions, and/or wherein the enhanced sulphate reduction reactor comprises a bed of untreated or pretreated woodchips as the carbon source, and/or wherein the treatment of the water in the secondary sulphide removal unit to remove sulphide therefrom comprises converting the sulphides to removable sulphur or metal sulphides by chemical and/or biochemical reaction, and separating the sulphur or metal sulphides from the water, with treated water being withdrawn from the secondary sulphide removal unit.

* * * * *

UNITED STATES PATENT AND TRADEMARK OFFICE
CERTIFICATE OF CORRECTION

PATENT NO. : 7,306,732 B2  
APPLICATION NO. : 10/476348  
DATED : December 11, 2007  
INVENTOR(S) : Pulles et al.

Page 1 of 1

It is certified that error appears in the above-identified patent and that said Letters Patent is hereby corrected as shown below:

Column 11, Claim 1, Line 45: Please correct "concentrationse"
To read -- concentrations --

Column 12, Claim 9, Line 49: Please correct "ractor"
To read -- reactor --

Signed and Sealed this

Fifteenth Day of April, 2008

JON W. DUDAS
*Director of the United States Patent and Trademark Office*